United States Patent
Vezzulli et al.

(10) Patent No.: US 8,865,944 B2
(45) Date of Patent: Oct. 21, 2014

(54) PROCESS FOR THE PURIFICATION OF POLYOL PFPE DERIVATIVES

(75) Inventors: Graziano Giuseppe Vezzulli, Milan (IT); Piero Gavezotti, Milan (IT); Fabrizio Mutta, Fino Mornasco (IT); Claudio Adolfo Pietro Tonelli, Sesto San Giovanni (IT)

(73) Assignee: Solvay Specialty Polymers Italy S.p.A., Bollate (Milano) (IT)

( * ) Notice: Subject to any disclaimer, the term of this patent is extended or adjusted under 35 U.S.C. 154(b) by 416 days.

(21) Appl. No.: 13/319,679

(22) PCT Filed: May 6, 2010

(86) PCT No.: PCT/EP2010/056177
§ 371 (c)(1),
(2), (4) Date: Nov. 9, 2011

(87) PCT Pub. No.: WO2010/130625
PCT Pub. Date: Nov. 18, 2010

(65) Prior Publication Data
US 2012/0055779 A1   Mar. 8, 2012

(30) Foreign Application Priority Data
May 15, 2009 (EP) .................................. 09160386

(51) Int. Cl.
| C07C 43/00 | (2006.01) |
| C08G 73/24 | (2006.01) |
| C09F 1/00 | (2006.01) |
| B01D 3/24 | (2006.01) |
| C08G 65/30 | (2006.01) |
| C08G 65/00 | (2006.01) |

(52) U.S. Cl.
CPC .............. C08G 65/007 (2013.01); C08G 65/30 (2013.01)
USPC ........... 568/615; 568/667; 528/401; 528/493; 203/38

(58) Field of Classification Search
USPC .............. 568/615, 667; 528/401, 493; 203/38
See application file for complete search history.

(56) References Cited

U.S. PATENT DOCUMENTS

| 6,350,306 B1 * | 2/2002 | Tonelli et al. ............ 106/287.26 |
| 2003/0100454 A1 | 5/2003 | Osawa et al. |
| 2004/0092406 A1 | 5/2004 | Osawa et al. |
| 2007/0298982 A1 | 12/2007 | Shimokawa et al. |

FOREIGN PATENT DOCUMENTS

| EP | 822216 A2 | 2/1998 |
| EP | 1372141 A1 | 12/2003 |
| JP | 20030041279 A | 2/2003 |
| WO | WO 20100130628 A1 | 5/2010 |

OTHER PUBLICATIONS

Turri, Stefano, et al—"End Group Chemistry of Fluoro-Oligomers. Highly Selective Syntheses of Diepoxy. Diallyl, and Tetrad Derivatives", Journal of Polymer Science. Part A, Polymer Chemistry, 1996, vol. 34, p. 3263-3275, John Wiley & Sons, Inc.; 13 pgs.

Schicchitano, Massimo, et al—"Synthesis and characterization of low-viscosity fluoropolyether-based segmented digorners", Die Angewandte Makromoleculare Chemie, 1995, vol. 231, No. 4000, p, 47-60, Hüthig & Wepf Verlag, Zug, 14 pgs.

\* cited by examiner

Primary Examiner — Sikarl Witherspoon
(74) Attorney, Agent, or Firm — Xuping Fu

(57) ABSTRACT

A process for purifying a polyol (per)fluoropolyether derivative [polyol (P)] from a mixture of hydroxyl (per)fluoropolyether derivatives [mixture (M)]. Such polyol (P) comprising one or more hydroxyl (per)fluoropolyether derivatives [PFPE (OH)] comprising at least one (per)fluoropolyoxyalkylene chain (chain $R_f$) and at least one end-group having formula $(t_3)$ —$CF_2CH_2OCH_2CH(OH)CH_2OCH_2CH(OH)CH_2OH$. Such mixture (M) comprising the polyol (P) and at least one PFPE (OH) different from the polyol (P) and comprising at least one chain $R_f$ and at least one end-group selected from end-groups having formula $(t_1)$ —$CF_2CH_2OH$ and formula $(t_2)$ —$CF_2CH_2OCH_2CH(OH)CH_2OH$. The process comprises the steps of: 1) reacting the mixture (M) with a ketone, an aldehyde or a combination thereof to yield corresponding mixture of cyclic ketal/acetal (per)fluoropolyether derivatives [PFPEs $(OH)_p$] [protected mixture (P)]; 2) carrying out a molecular distillation of the protected mixture (P) to isolate a protected product heavy residue [product $(P_r)$]; 3) hydrolyzing the product $(P_r)$ to yield deprotected product [product $(P_d)$]; and 4) carrying out a distillation under reduced pressure of the product $(P_d)$ to obtain polyol (P).

10 Claims, No Drawings

PROCESS FOR THE PURIFICATION OF POLYOL PFPE DERIVATIVES

CROSS-REFERENCE TO RELATED APPLICATIONS

This application is a U.S. national stage application under 35 U.S.C. §371 of International Application No. PCT/EP2010/056177 filed May 6, 2010, which claims priority to European application No. 09160386.0 filed May 15, 2009, the whole content of this application being incorporated herein by reference for all purposes.

TECHNICAL FIELD

The invention pertains to a process for the purification of polyol fluoropolyether compounds useful as additives for lubricants for magnetic media.

BACKGROUND ART

As well known, magnetic recording apparatus are divided into those using a magnetic disk as the medium on which to record data and those using magnetic tape as such medium. Because the former type of recording apparatus using a magnetic disk (hereinafter referred to as magnetic disk drives) is prevailing, the following description focuses on magnetic disk drives as an example of the magnetic recording apparatus.

As the capacity enlargement of magnetic disk drives has been pursued for recent years, the fly height of the magnetic head has been lowered rapidly down to below 30 nm, and, consequently, there is increasing need for reliability in terms of resistance to sliding friction.

Also, there is strong need to enhance the data processing speed with more disk capacity. In particular, in a Redundant Array of Independent Disks (RAID) system, a magnetic disk drive that operates at a disk revolving speed of 10,000 rmp or higher is required.

In order to ensure the reliability of a magnetic disk drive, generally, a lubricant layer is formed on a carbon overcoat on the surface of a magnetic disk for use in the disk drive. As the main material of the lubricant layer, usually, fluoropolyether, which is a chemically stable fluorinated organic compound, is widely used.

Actually, in order to assure reliability of the magnetic disk drive, it is mandatory to efficiently preserve suitable lubricant distribution on the surface of said magnetic disk drive for long operating times. When magnetic disk drives operate, said disks revolve at a high speed and the lubricant might be spun off by the combined action of the air shear due to the air flow on the surface of the disk as the disk revolves, and of the centrifugal force directly exerted on the lubricant. As a consequence, it is often observed that the quantity of the lubricant on the surface of the disk gradually decreases. Also, evaporation phenomena of the lubricant into the atmosphere inside the magnetic drive may take place.

To overcome problems of the lubricant loss by being spun off during disk revolution and natural evaporation, approaches have heretofore been proposed. Thus, a method for restraining the lubricant from being spun off and evaporated has been proposed in which the adhesion force of the lubricant to the disk protecting layer is made stronger by increasing the polarity of the functional end-groups in the lubricant. Said polar end-groups are believed to improve adherence of the lubricant to the surface of the magnetic media.

Within this approach, fluoropolyether lubricants based on fluoropolyethers as the backbone and having hydroxyl functional groups as their end-groups have shown best performances.

A class of compounds which have been found to plenty fulfil requirements for being used as magnetic media lubricants are fluoropolyether derivatives comprising fluoropolyoxyalkylene chains and end-groups comprising multiple hydroxyl groups.

Such materials can be notably manufactured by reaction of epihalohydrins with perfluoropolyether derivatives having two hydroxyl end-groups (see Scheme 1 here below), as taught in TURRI, Stefano, et al. End group chemistry of fluoro-oligomers: highly selective syntheses of diepoxy, diallyl, and tetraol derivatives. (A) *J. polym. sci, A, Polym. chem.* 1996, vol. 34, p. 3263-3275. Scheme 1

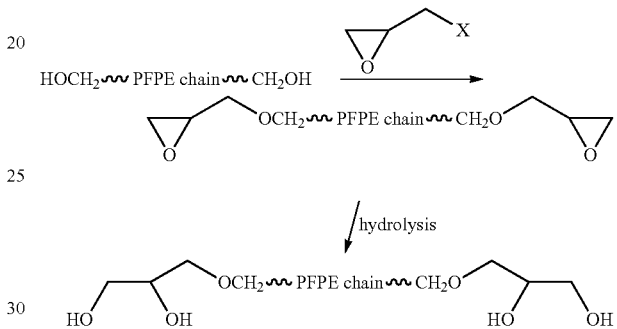

Despite above sketched stoichiometry, side reactions are likely to occur during nucleophilic substitution on the epihalohydrin, involving e.g. reactions of oxirane ring with further PFPE hydroxyl derivatives, yielding materials comprising more than one PFPE chain block and/or different hydroxyl groups.

Similarly, reaction of perfluoropolyether derivatives having two hydroxyl end-groups with glycidol of formula:

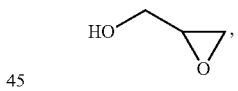

as described in SCHICCHITANO, Massimo, et al. Synthesis and characterization of low-viscosity fluoropolyether-based segmented oligomers. *Die Angewandte Makromolekulare Chemie.* 1995, vol. 231, no. 1, p. 47-60, yields, in addition to the expected epoxy-substituted derivatives (which can be further converted in corresponding diols), a large range of side-products. As an example, PFPE hydroxyl derivatives can open the oxirane ring of the targeted compound, yielding materials comprising more than one PFPE chain block, and/or, more frequently, a further glycidol molecule can react with the epoxide ring of above mentioned targeted epoxy-substituted intermediate, so that different species are formed.

Mixtures obtained from processes of the prior art are thus generally complex compositions comprising unreacted precursors, targeted polyol derivatives and polymeric material comprising several PFPE chain blocks and/or several ex-glycidol molecules moieties, which require burdensome separation procedures.

Also, the broad molecular weight distribution of the starting perfluoropolyether diol mixture used for manufacturing corresponding tetraol derivatives by reaction with glycidol and/or epihalohydrins as above detailed makes it even more difficult to separate materials based on their respective volatility, as this parameter is both affected by the molecular weight and the functionality degree of the end-chains.

Complex purification procedures, based e.g. on supercritical carbon dioxide extraction techniques are thus required for purifying target material, so as to achieve the expected chemical structure and level of functionality at the end-groups.

Approaches of this type are described, for instance, in US 2004092406 (FUJI ELECTRIC CO LTD (JP)) May 13, 2004, in US 2003100454 (FUJI ELECTRIC CO LTD (JP)) May 29, 2003 and EP 1372141 A (HITACHI LTD (JP)) Dec. 17, 2003.

Due to the extreme wear conditions wherein said lubricants are to be used, in particular for hard disks lubrication, it is essential to be able to isolate compounds having well-defined functionality in end-groups and thus homogeneous behaviour in lubrication, adherence and resistance against evaporative loss.

The need was thus felt in the art for a process for the purification of hydroxyl (per)fluoropolyether derivatives aiming at lowering energy consumption and simplifying operations, which could provide for (per)fluoropolyether polyols having at least one end-group containing three hydroxyl groups.

DISCLOSURE OF INVENTION

It is thus an object of the present invention a process for the purification of a polyol (per)fluoropolyether derivative [polyol (P)], said polyol (P) comprising one or more hydroxyl (per)fluoropolyether derivatives [PFPEs (OH)] comprising at least one (per)fluoropolyoxyalkylene chain (chain $R_f$) and at least one end-group having formula —$CF_2CH_2OCH_2CH(OH)CH_2$ $OCH_2CH(OH)CH_2OH$ ($t_3$), from a mixture of hydroxyl (per)fluoropolyether derivatives [mixture (M)], said mixture (M) comprising said polyol (P) and at least one hydroxyl (per)fluoropolyether derivative [PFPE (OH)] different from polyol (P) and comprising at least one (per)fluoropolyoxyalkylene chain (chain $R_f$) and at least one end-group selected from those having formulae —$CF_2CH_2OH$ ($t_1$) and —$CF_2CH_2OCH_2CH(OH)CH_2OH$ ($t_2$), said process comprising the following steps:
step 1: reacting the mixture (M) with a ketone and/or an aldehyde so as to yield corresponding mixture of cyclic ketal/acetal (per)fluoropolyether derivatives [PFPEs (OH)$_p$] [protected mixture (P)];
step 2: molecular distillation of the protected mixture (P) so as to isolate a protected product heavy residue [product ($P_r$)];
step 3: hydrolyzing the product ($P_r$) so as to yield a deprotected product [product ($P_d$)];
step 4: distillation under reduced pressure of the product ($P_d$) so as to obtain polyol (P).

The Applicant has found that by means of the process of the invention it is advantageously possible to isolate polyols (P) to be successfully used as additives for lubricants for magnetic media.

The hydroxyl (per)fluoropolyether derivative [PFPE (OH)] typically comprises at least one (per)fluoropolyoxyalkylene chain (chain $R_f$) and at least one end-group selected from the followings:
($t_1$) —$CF_2CH_2OH$;
($t_2$) —$CF_2CH_2OCH_2CH(OH)CH_2OH$;
($t_3$) —$CF_2CH_2OCH_2CH(OH)CH_2OCH_2CH(OH)CH_2OH$.

The (per)fluoropolyoxyalkylene chain (chain $R_f$) of the PFPE (OH) is typically a chain comprising recurring units R°, said recurring units having general formula —$(CF_2)_j$— CFK—O—, wherein j is an integer of from 0 to 3 and K is selected between a fluorine atom and a $C_1$-$C_5$ perfluoro(oxy)alkyl group.

The hydroxyl (per)fluoropolyether derivative [PFPE (OH)] preferably complies with formula (I-A) here below:

$$T_1\text{-O}\text{—}R_f\text{-}T_2 \tag{I-A}$$

wherein:
$R_f$ is a (per)fluoropolyoxyalkylene chain (chain $R_f$);
$T_1$ and $T_2$, equal or different from each other, are independently selected from the end-groups having formulae ($t_1$), ($t_2$) and ($t_3$) as defined above.

The hydroxyl (per)fluoropolyether derivative [PFPE (OH)] more preferably complies with formula (II-A) here below:

$$T_1\text{-O}\text{—}(CFX^1O)_{c1}(CFX^2CFX^3O)_{c2}$$

$$(CF_2CF_2CF_2O)_{c3}(CF_2CF_2CF_2CF_2O)_{c4}\text{-}T_2 \tag{II-A}$$

wherein:
$X^1$, $X^2$, $X^3$, equal or different from each other, are independently selected between a fluorine atom and a —$CF_3$ group;
$T_1$ and $T_2$ are defined as above;
c1, c2, c3 and c4, equal or different from each other, are independently integers ≥0 such that the sum c1+c2+c3+c4 is in the range between 5 and 2000, preferably between 10 and 500; should at least two of c1, c2, c3 and c4 be different from zero, the recurring units are generally statistically distributed along the (per)fluoropolyoxyalkylene chain.

The hydroxyl (per)fluoropolyether derivative [PFPE (OH)] even more preferably complies with formula (III-A) here below:

$$T_1\text{-O}(CF_2O)_{c1}(CF_2CF_2O)_{c2}\text{-}T_2 \tag{III-A}$$

wherein:
$T_1$ and $T_2$ are defined as above;
c1 and c2 are independently integers >0 such that the sum c1+c2 is in the range between 5 and 2000, preferably between 10 and 500, the recurring units being generally statistically distributed along the (per)fluoropolyoxyalkylene chain.

The polyol (per)fluoropolyether derivative [polyol (P)] preferably comprises (more preferably consists essentially of) a hydroxyl (per)fluoropolyether derivative [PFPE (OH)] complying with formula (I-A) as described above, wherein one of $T_1$ and $T_2$ is an end-group having formula ($t_3$) as defined above, the reminder being an end-group having formula ($t_2$) as defined above, that is to say that the polyol (P) comprises (more preferably consists essentially of) a pentaol (per)fluoropolyether derivative [pentaol (P)].

The polyol (P) more preferably comprises a hydroxyl (per)fluoropolyether derivative [PFPE (OH)] complying with formula (II-A) as described above, wherein $T_1$ and $T_2$ are defined as above.

The polyol (P) even more preferably comprises a hydroxyl (per)fluoropolyether derivative [PFPE (OH)] complying with formula (III-A) as described above, wherein $T_1$ and $T_2$ are defined as above.

The mixture (M) preferably comprises a polyol (P) as defined above and at least one PFPE (OH) which is different from said polyol (P) and complies with formula (I-A) as described above, wherein $T_1$ and $T_2$ independently represent end-groups having formulae ($t_1$) and ($t_2$) as defined above.

The mixture (M) more preferably comprises a polyol (P) as defined above and at least one PFPE (OH) which is different from said polyol (P) and complies with formula (II-A) as described above, wherein $T_1$ and $T_2$ independently represent end-groups having formulae $(t_1)$ and $(t_2)$ as defined above.

The mixture (M) even more preferably comprises a polyol (P) as defined above and at least one PFPE (OH) which is different from said polyol (P) and complies with formula (III-A) as described above, wherein $T_1$ and $T_2$ independently represent end-groups having formulae $(t_1)$ and $(t_2)$ as defined above.

The mixture (M) is typically manufactured reacting at least one diol (per)fluoropolyether derivative [PFPE $(OH)_2$] comprising at least one (per)fluoropolyoxyalkylene chain (chain $R_f$) and two diol end-groups with epihalohydrins or with glycidol having formula:

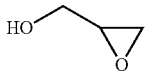

The diol (per)fluoropolyether derivative [PFPE $(OH)_2$] typically complies with formula (I-A) as described above, wherein $T_1$ and $T_2$ both comply with end-groups having formula $(t_1)$ as defined above.

The diol (per)fluoropolyether derivative [PFPE $(OH)_2$] has preferably a polydispersity index (PDI) ranging from 1 to 1.4, more preferably from 1 to 1.35, even more preferably from 1 to 1.3.

The polydispersity index (PDI) is hereby expressed as the ratio of weight average molecular weight $(M_w)$ to number average molecular weight $(M_n)$, as determined notably by GPC, wherein:

weight average molecular weight $(M_w)$ is:

$$M_w = \frac{\sum M_i^2 \cdot N_i}{\sum M_i \cdot N_i}$$

number average molecular weight $(M_n)$ is:

$$M_n = \frac{\sum M_i \cdot N_i}{\sum N_i}.$$

Non-limitative examples of suitable PFPEs $(OH)_2$ include, notably, diol (per)fluoropolyether derivatives available from Solvay Solexis S.p.A. under the tradenames FOMBLIN® Z-DOL 1000 (polydispersity index of about 1.07), FOMBLIN® Z-DOL 2000 (polydispersity index of about 1.05), FOMBLIN® Z-DOL 2000 (polydispersity index of about 1.25), FOMBLIN® Z-DOL 3000 (polydispersity index of about 1.08).

The mixture (M) is preferably manufactured reacting at least one diol (per)fluoropolyether derivative [PFPEs $(OH)_2$] as defined above with glycidol.

The mixture (M) is more preferably manufactured reacting at least one diol (per)fluoropolyether derivative [PFPE $(OH)_2$] as defined above with glycidol, wherein the glycidol/PFPE $(OH)_2$ equivalent ratio is typically higher than 1.1 and typically lower than 1.4.

By carrying out the reaction of at least one PFPE $(OH)_2$ with glycidol with a glycidol/PFPE $(OH)_2$ equivalent ratio higher than 1.1 and lower than 1.4, preferably ranging between 1.2 and 1.35, it is advantageously possible to successfully obtain a mixture (M) comprising a mixture of hydroxyl (per)fluoropolyether derivatives, wherein at least 15% moles of end-groups are end groups of formula $t_3$ as above detailed.

When the glycidol/PFPE $(OH)_2$ equivalent ratio is 1.1 or lower, a mixture (M) comprising polyol (P) is generally obtained, wherein nevertheless main component is tetraol (T). While these mixtures can be indeed used in the purification process of the present invention, these are not generally preferred.

For the avoidance of doubt, the term "tetraol (T)" is hereby intended to denote a hydroxyl (per)fluoropolyether derivative [PFPE (OH)] complying with formula (I-A) as described above, wherein $T_1$ and $T_2$ both comply with end-groups having formula $(t_2)$ as defined above.

When the glycidol/PFPE $(OH)_2$ equivalent ratio is equal to or higher than 1.4, a mixture (M) comprising polyol (P) is generally obtained, wherein nevertheless hexaol (H) is present. While these mixtures can be indeed used in the purification process of the present invention, these are not generally preferred, as preferred polyol (P) is a pentaol (P) as above detailed.

For the avoidance of doubt, the term "hexaol (H)" is hereby intended to denote a polyol (per)fluoropolyether derivative [polyol (P)] complying with formula (I-A) as described above, wherein $T_1$ and $T_2$ both comply with end-groups having formula $(t_3)$ as defined above.

The mixture (M) typically comprises a mixture of hydroxyl (per)fluoropolyether derivatives [PFPEs (OH)] comprising the following end-groups:

from 1% to 10% by moles, preferably from 2% to 8% by moles of end-groups having formula $(t_1)$ as defined above;

from 60% to 90% by moles, preferably from 65% to 80% by moles of end-groups having formula $(t_2)$ as defined above;

from 15% to 40% by moles, preferably from 20% to 30% by moles of end-groups having formula $(t_3)$ as defined above.

Step 1 of the process of the invention is advantageously carried out by reacting the mixture (M) with a ketone and/or an aldehyde so as to yield corresponding mixture of cyclic ketal/acetal (per)fluoropolyether derivatives [PFPEs $(OH)_p$] [protected mixture (P)].

Non-limitative examples of suitable ketones and aldehydes include, notably, acetone, methylethylketone, cyclohexanone, phenylmethylketone, acetaldehyde.

Step 1 is typically carried out in the presence of a protic acid. Non-limitative examples of suitable protic acids include, notably, p-toluensulphonic acid, acetic acid, sulphuric acid.

Step 1 is optionally carried out in the presence of one or more organic solvents able to at least partially dissolve the mixture (M) and the ketone and/or the aldehyde. Non-limitative examples of suitable organic solvents include, notably, petroleum ether, butyl acetate, dimethylformamide, toluene, hexane. According to certain embodiments of the invention, Step 1 is carried out in the absence of an organic solvent, as above detailed, the ketone and/or the aldehyde also effecting at least partial solubilisation of mixture (M).

Couples of hydroxyl groups on vicinal carbon atoms of the hydroxyl (per)fluoropolyether derivatives [PFPEs (OH)] of the mixture (M) are advantageously selectively protected in step 1 of the process of the invention due to the increased stability of the five-membered cyclic ketal/acetal structures so obtained with respect to reaction of distal hydroxyl groups of said PFPEs (OH) with a ketone and/or an aldehyde.

Thus, it has been found that in step 1 of the process of the invention end-groups having formulae ($t_2$) and ($t_3$) as defined above typically react to advantageously yield corresponding protected or hemi-protected end-groups having formulae ($t_{2p}$) and ($t_{3p}$) respectively as sketched in the scheme here below, whereas end-groups having formula ($t_1$) remain unreacted under the same conditions:

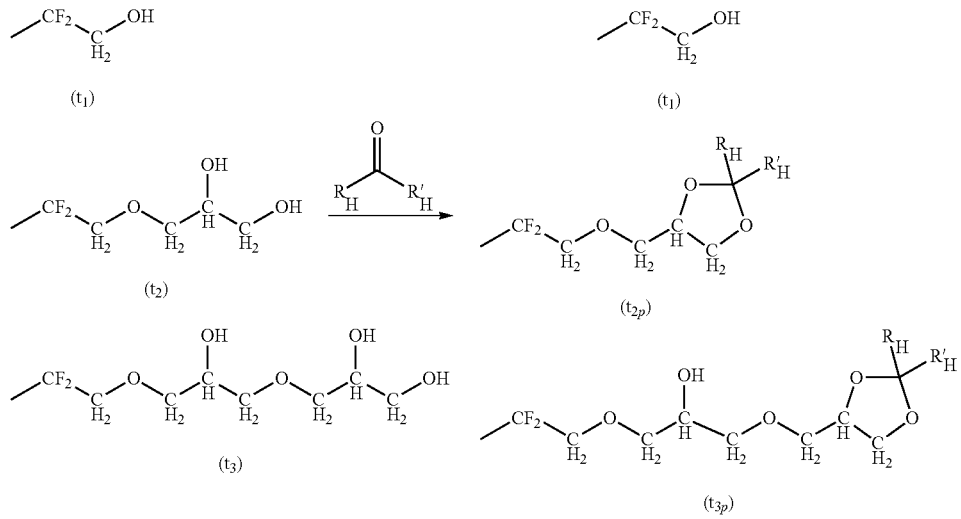

In the scheme hereinabove, $R_H$ and $R'_H$ are intended to independently represent a hydrogen atom or a $C_1$-$C_{12}$ hydrocarbon group, with the proviso that at least one of $R_H$ and $R'_H$ is different from hydrogen.

The cyclic ketal/acetal (per)fluoropolyether derivative [PFPE $(OH)_p$] typically comprises at least one (per)fluoropolyoxyalkylene chain (chain $R_f$) and at least one end-group selected from those having formulae ($t_1$), ($t_{2p}$) and ($t_{3p}$) as defined in the scheme hereinabove.

The cyclic ketal/acetal (per)fluoropolyether derivative [PFPE $(OH)_p$] preferably complies with formula (I-B) here below:

$$T'_1\text{—}O\text{—}R_f\text{—}T'_2 \quad\quad\quad (I\text{-}B)$$

wherein:

$R_f$ is a (per)fluoropolyoxyalkylene chain (chain $R_f$);

$T'_1$ and $T'_2$, equal or different from each other, are independently selected from the end-groups having formulae ($t_1$), ($t_{2p}$) and ($t_{3p}$) as defined above.

The protected mixture (P) typically comprises a hemi-protected polyol (P) [polyol ($P_p$)], said polyol ($P_p$) comprising one or more cyclic ketal/acetal (per)fluoropolyether derivatives [PFPEs $(OH)_p$] comprising at least one (per)fluoropolyoxyalkylene chain (chain $R_f$) and at least one end-group having formula ($t_{3p}$) as defined above, and at least one cyclic ketal/acetal (per)fluoropolyether derivative [PFPE $(OH)_p$] which is different from said polyol ($P_p$) and comprises at least one (per)fluoropolyoxyalkylene chain (chain $R_f$) and at least one end-group selected from those having formulae ($t_1$) and ($t_{2p}$) as defined above.

In step 2 of the process of the invention, the protected mixture (P) is submitted to a molecular distillation.

For the avoidance of doubt, the term "molecular distillation" is hereby intended to denote the process of distilling a substance from an evaporating surface to a nearby condensing surface; vapours are thus generally moving across space typically so highly evacuated that no intermolecular collision generally occurs before condensation.

The molecular distillation is generally carried out by using a falling-film molecular distillatory apparatus wherein the distilled liquid, continuously passed down a heated evaporating cylinder, evaporates partially and the vapors then condense on an internally cooled condenser placed close to the evaporating cylinder. The evaporator is typically maintained under reduced pressure.

Light fraction collected from step 2 generally consists essentially of a mixture of cyclic ketal/acetal (per)fluoropolyether derivatives [PFPEs $(OH)_p$] comprising end-groups having formulae ($t_1$) and ($t_{2p}$) as defined above, while heavy residue collected from step 2 is generally a polyol ($P_p$) as defined above.

A protected product heavy residue [product ($P_r$)] is advantageously isolated from step 2.

For the avoidance of doubt, the term "protected product heavy residue [product ($P_r$)]" is hereby intended to denote the heavy residue isolated from step 2 of the process of the invention, said heavy residue being a polyol ($P_p$) as defined above.

In step 3 of the process of the invention, the product ($P_r$), as recovered from step 2, is submitted to hydrolysis so as to yield a deprotected product [product ($P_d$)].

For the avoidance of doubt, the term "deprotected product [product ($P_d$)]" is hereby intended to denote the product deriving from deprotection of vicinal hydroxyl groups on polyol ($P_p$) as defined above.

The hydrolysis is typically carried out under acid catalysis. The product ($P_r$), as recovered from step 2, is generally contacted with an acid aqueous or an acid aqueous alcoholic solution (e.g. an aqueous or an aqueous alcoholic solution of HCl, $H_2SO_4$, $CH_3COOH$).

In step 4 of the process of the invention, the product ($P_d$), as recovered from step 3, is submitted to distillation under reduced pressure so as to obtain polyol (P) as defined above.

The polyol (P) typically comprises an amount of pentaol (P) as defined above of at least 50% moles, preferably of at least 55% moles, more preferably of at least 60% moles.

Notwithstanding the multi-step process of the invention, wherein each of the above-mentioned steps proceeds with quantitative conversion and high selectivity, the Applicant has found that by means of said process it is thus possible to advantageously recover polyols (P) which can be successfully used as additives for lubricants for magnetic media.

Should the disclosure of any patents, patent applications, and publications which are incorporated herein by reference conflict with the description of the present application to the extent that it may render a term unclear, the present description shall take precedence.

The present invention will be now described in more detail with reference to the following examples, whose purpose is merely illustrative and not limitative of the scope of the invention.

EXAMPLE 1

Synthesis of Mixture (M1)

Reaction of FOMBLIN® Z-DOL 2000 PFPE (Polydispersity Index 1.05) with Glycidol

FOMBLIN® Z-DOL 2000 PFPE (EW 994 g/eq.; 3.62 eq.; polydispersity index 1.05) was charged into a 10 lt. jacketed reactor equipped with a thermometer, a condenser and a mechanical stirrer and heated to 40° C. by diathermic oil circulation in the jacket.

0.36 moles of potassium tert-butylate were then added thereto and the so-obtained mixture was stirred until complete dissolution.

The temperature was raised to 65° C. and 4.89 moles of glycidol were fed into the reactor during 6 hours.

The reaction was carried out during 4 hours. The reaction mixture was then cooled down to room temperature and a crude product was recovered by washing with a mixture of 690 g of demineralised water, 200 g of a 30 wt. % aqueous solution of HCl and 690 g of isobutylic alcohol and subsequent washing with 2×450 g of demineralised water.

The reaction product (3.47 eq.) was recovered by distillation under reduced pressure (yield: 95.9%) and characterized by $^1$H-NMR analysis as such and after derivatization treatment with trifluoroacetic anhydride. Derivatized products were prepared by treating 5 g of the reaction product with 10 g of trifluoroacetic anhydride so as to convert hydroxyl groups into corresponding trifluoroacetate groups. The excess trifluoroacetic anhydride was removed by distillation under reduced pressure.

Results are summarized here below:

$^1$H-NMR (neat sample): a complex pattern of signals around 3.3-4.0 ppm (due to —CH$_2$— and —CH(–)-groups, intensity: about 8H) and a signal at 4.9 ppm (due to the —OH groups, intensity: about 2.2H) were detected.

$^1$H-NMR (freon 113-acetone solution of derivatized sample):
5.0 ppm —CH$_2$— group of R$_f$CF$_2$CH$_2$OCOCF$_3$;
5.7 ppm —CH— group of R$_f$CF$_2$CH$_2$OCH$_2$CH(OCOCF$_3$)CH$_2$OCOCF$_3$ and R$_f$— CF$_2$CH$_2$OCH$_2$CH(OCOCF$_3$)CH$_2$OCH$_2$CH(OCOCF$_3$)CH$_2$OCOCF$_3$;
5.4 ppm —CH— group of R$_f$CF$_2$CH$_2$OCH$_2$CH(OCOCF$_3$)CH$_2$OCH$_2$CH(OCOCF$_3$)CH$_2$OCOCF$_3$;
3.7-4.8 signals of other —CH$_2$— groups.

The analysis yielded the following end-groups composition:
5% by moles of end-groups of formula —CF$_2$CH$_2$OH;
70% by moles of end-groups of formula —CF$_2$CH$_2$OCH$_2$CH(OH)CH$_2$OH;
25% by moles of end-groups of formula —CF$_2$CH$_2$OCH$_2$CH(OH)CH$_2$OCH$_2$CH(OH)CH$_2$OH.

As determined by GPC analysis, the product had an average molecular weight of 2192 g/mol and a polydispersity index of 1.05.

Step 1.1: Protection of Vicinal Hydroxyl Groups

In a 10 lt. jacketed reactor, equipped with a thermometer, a magnetic stirrer and a total reflux phase-separating head, 3.77 Kg (3.47 eq.) of the product obtained as in Example 1, synthesis of mixture (M1), 1800 g of acetone, 850 g of petroleum ether and 1 ml of 96% sulphuric acid were introduced.

The reaction mixture was refluxed under stirring and water was removed and collected in an external trap. When water evolution stopped (about 20 hours), the mixture was cooled down to room temperature and 10 g of anhydrous sodium acetate were added. After 30 minutes under stirring, the mixture was filtered and petroleum ether and acetone were removed by distillation under reduced pressure.

A clear low-viscous product (4.0 Kg, 3.47 eq.) was isolated (yield: 100%) and characterized by $^1$H-NMR.

$^1$H NMR (A113/CD$_3$OD): CH$_3$ 1.32 and 1.37 ppm (6H); a complex pattern of signals at 3.5-4.3 ppm (about 8H) due to other protons (the complexity is originated by the presence of the cyclic ketal which contains a stereogenic center).

Step 1.2: Molecular Distillation

The product (4.0 Kg; 3.47 eq.) obtained as in Example 1, step 1.1, was purified in a molecular distillator at 200° C. under $7 \times 10^{-3}$ mBar. The feed flow rate was set at 250 g/h.

Two low-viscous fractions were collected, a heavy residue (43.75% by weight) and a light fraction (56.25% by weight).

Step 1.3 and step 1.4: Deprotection of the Heavy Residue and Distillation of
Final Product In a 5 lt. jacketed reactor, equipped with a thermometer, a magnetic stirrer and a condenser, 1.75 Kg of the heavy residue obtained as in Example 1, step 1.2, 380 g of methyl alcohol, 170 g of demineralised water and 42 g of a 30 wt. % aqueous solution of HCl were introduced. The reaction mixture was heated to 65° C. under stirring during 4 hours.

A clear solid product (1.66 Kg) was recovered by distillation under reduced pressure and characterized by $^1$H-NMR following same procedure as detailed in Example 1, synthesis of mixture (M1).

Results are summarized here below:

$^1$H-NMR (freon 113-acetone solution of derivatized sample):
5.0 ppm —CH$_2$— group of R$_f$CF$_2$CH$_2$OCOCF$_3$;
5.7 ppm —CH— group of R$_f$CF$_2$CH$_2$OCH$_2$CH(OCOCF$_3$)CH$_2$OCOCF$_3$;
5.4 ppm —CH— group of R$_f$CF$_2$CH$_2$OCH$_2$CH(OCOCF$_3$)CH$_2$OCH$_2$CH(OCOCF$_3$)CH$_2$OCOCF$_3$;
3.7-4.8 signals of other —CH$_2$— groups.

The analysis yielded the following end-groups composition:
3% by moles of end-groups of formula —CF$_2$CH$_2$OH;
50% by moles of end-groups of formula —CF$_2$CH$_2$OCH$_2$CH(OH)CH$_2$OH;
47% by moles of end-groups of formula —CF$_2$CH$_2$OCH$_2$CH(OH)CH$_2$OCH$_2$CH(OH)CH$_2$OH.

The composition of the mixture, as determined by ¹H-NMR analysis, was the following:

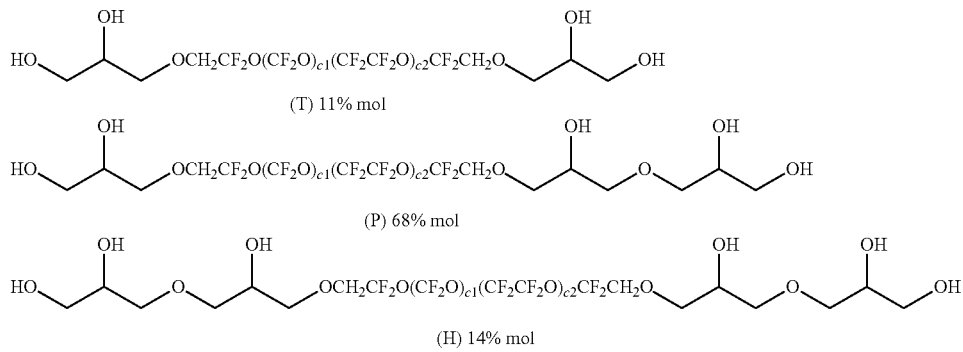

(T) 11% mol (P) 68% mol (H) 14% mol

Also, compounds having at least one end-group having formula —$CF_2CH_2OH$ were detected (7% by moles).

As determined by GPC analysis, the product had an average molecular weight of 2220 g/mol and a polydispersity index of 1.04.

EXAMPLE 2

Synthesis of Mixture (M2)

Reaction of FOMBLIN® Z-DOL 2000 PFPE (Polydispersity Index 1.25) with Glycidol

Same procedure as detailed in Example 1, synthesis of mixture (M1), was followed, but reacting 3.58 eq. of FOMBLIN® Z-DOL 2000 PFPE (EW 1006 g/eq.; polydispersity index 1.25) with 4.83 moles of glycidol during 5 hours.

The reaction product (3.38 eq.) was recovered by distillation under reduced pressure (yield: 94.5%) and characterized by ¹H-NMR analysis following same procedure as detailed in Example 1.

The analysis yielded the following end-groups composition:
5% by moles of end-groups of formula —$CF_2CH_2OH$;
68% by moles of end-groups of formula —$CF_2CH_2OCH_2CH(OH)CH_2OH$;
27% by moles of end-groups of formula —$CF_2CH_2OCH_2CH(OH)CH_2OCH_2CH(OH)CH_2OH$.

As determined by GPC analysis, the product had an average molecular weight of 2196 g/mol and a polydispersity index of 1.28.

Step 2.1: Protection of Vicinal Hydroxyl Groups
Same procedure as detailed in Example 1, step 1.1, was followed but charging the reactor with 3.7 Kg (3.38 eq.) of the product obtained as in Example 2, synthesis of mixture (M2).

A clear low-viscous product (3.74 Kg, 3.3 eq.) was isolated (yield: 97.5%) and characterized by ¹H-NMR analysis.

Step 2.2: Molecular Distillation
The product (3.74 Kg; 3.3 eq.) obtained as in Example 2, step 2.1, was purified in a molecular distillator at 200° C. under 7.5×10⁻³ mBar. The feed flow rate was set at 200 g/h.

Two low-viscous fractions were collected, a heavy residue (60.6% by weight) and a light fraction (39.4% by weight).

Step 2.3 and Step 2.4: Deprotection of the Heavy Residue and Distillation of Final Product
Same procedure as detailed in Example 1, step 1.3, was followed but charging the reactor with 2.62 Kg of the heavy residue obtained as in Example 2, step 2.2, and heating the reaction mixture to 65° C. under stirring during 5 hours.

A clear solid product (2.51 Kg) was recovered by distillation under reduced pressure and characterized by ¹H-NMR following same procedure as detailed in Example 1, synthesis of mixture (M1).

The analysis yielded the following end-groups composition:
3% by moles of end-groups of formula —$CF_2CH_2OH$;
53% by moles of end-groups of formula —$CF_2CH_2OCH_2CH(OH)CH_2OH$;
44% by moles of end-groups of formula —$CF_2CH_2OCH_2CH(OH)CH_2OCH_2CH(OH)CH_2OH$.

The composition of the mixture, as determined by ¹H-NMR analysis, was the following:

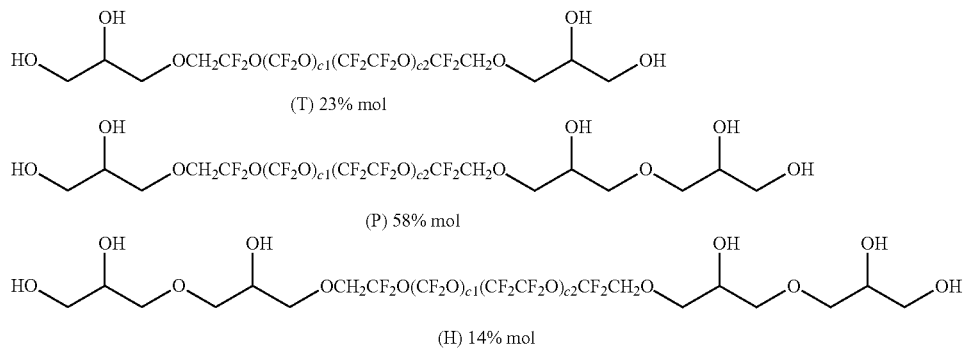

(T) 23% mol (P) 58% mol (H) 14% mol

Also, compounds having at least one end-group having formula —$CF_2CH_2$ OH were detected (5% by moles).

As determined by GPC analysis, the product had an average molecular weight of 2520 g/mol and a polydispersity index of 1.19.

EXAMPLE 3

Synthesis of Mixture (M3)

Reaction of FOMBLIN® Z-DOL 1000 PFPE (Polydispersity Index 1.07) with Glycidol

Same procedure as detailed in Example 1, synthesis of mixture (M1), was followed, but reacting into a 5 lt. reactor 2.0 eq. of FOMBLIN® Z-DOL 1000 PFPE (EW 501 g/eq.; polydispersity index 1.07), 0.20 moles of potassium tert-butylate and 2.7 moles of glycidol during 5 hours and recovering a crude product by washing with a mixture of 350 g of demineralised water, 100 g of a 30 wt. % aqueous solution of HCl and 350 g of isobutylic alcohol and subsequent washing with 2×240 g of demineralised water. The reaction product (1.89 eq.) was recovered by distillation under reduced pressure (yield: 94.1%) and characterized by $^1$H-NMR analysis following same procedure as detailed in Example 1, synthesis of mixture (M1).

The analysis yielded the following end-groups composition:
- 3% by moles of end-groups of formula —$CF_2CH_2OH$;
- 71% by moles of end-groups of formula —$CF_2CH_2OCH_2CH(OH)CH_2OH$;
- 26% by moles of end-groups of formula —$CF_2CH_2OCH_2CH(OH)CH_2OCH_2CH(OH)CH_2OH$.

As determined by GPC analysis, the product had an average molecular weight of 1207 g/mol and a polydispersity index of 1.06.

Step 3.1: Protection of Vicinal Hydroxyl Groups

Same procedure as detailed in Example 1, step 1.1, was followed but charging the reactor with 1.11 Kg (1.89 eq.) of the product obtained as in Example 3, synthesis of mixture (M3), 900 g of acetone, 425 g of petroleum ether and 0.5 ml of 96% sulphuric acid and, when water evolution stopped (about 15 hours), adding to the reaction mixture 5 g of anhydrous sodium acetate.

A clear low-viscous product (1.17 Kg, 1.89 eq.) was isolated (yield: 98%) and characterized by $^1$H-NMR analysis.

Step 3.2: Molecular Distillation

The product (1.17 Kg; 1.89 eq.) obtained as in Example 3, step 3.1, was purified in a molecular distillator at 130° C. under 1×10$^{-2}$ mBar. The feed flow rate was set at 115 g/h.

Two low-viscous fractions were collected, a heavy residue (43.6% by weight) and a light fraction (56.4% by weight).

Step 3.3 and Step 3.4: Deprotection of the Heavy Residue and Distillation of Final Product Same procedure as detailed in Example 1, step 1.3, was followed but charging the reactor with 0.51 Kg of the heavy residue obtained as in Example 3, step 3.2, 200 g of methyl alcohol, 85 g of demineralised water and 20 g of a 30 wt. % aqueous solution of HCl.

A clear solid product (0.47 Kg) was recovered by distillation under reduced pressure and characterized by $^1$H-NMR following same procedure as detailed in Example 1, synthesis of mixture (M1).

The analysis yielded the following end-groups composition:
- 2% by moles of end-groups of formula —$CF_2CH_2OH$;
- 53% by moles of end-groups of formula —$CF_2CH_2OCH_2CH(OH)CH_2OH$;
- 45% by moles of end-groups of formula —$CF_2CH_2OCH_2CH(OH)CH_2OCH_2CH(OH)CH_2OH$.

The composition of the mixture, as determined by $^1$H-NMR analysis, was the following:

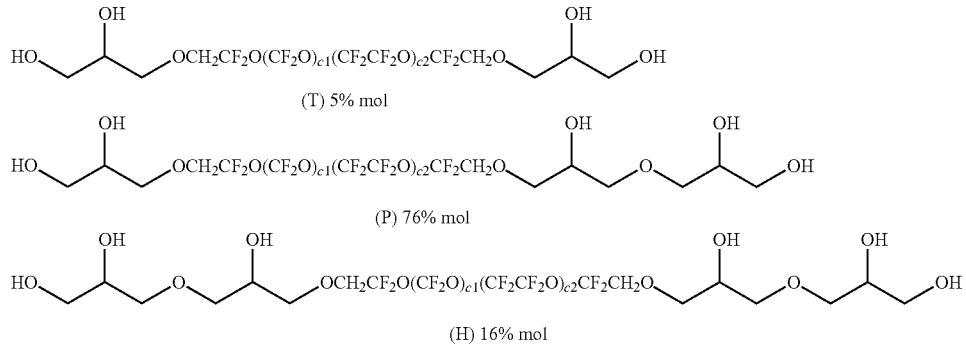

Also, compounds having at least one end-group having formula —$CF_2CH_2OH$ were detected (3% by moles).

As determined by GPC analysis, the product had an average molecular weight of 1260 g/mol and a polydispersity index of 1.07.

EXAMPLE 4

Synthesis of Mixture (M4)

Reaction of FOMBLIN® Z-DOL 3000 PFPE (Polydispersity Index 1.08) with Glycidol

Same procedure as detailed in Example 1, synthesis of mixture (M1), was followed, but reacting 3.5 eq. of FOMBLIN® Z-DOL 3000 PFPE (EW 1520 g/eq.; polydispersity index 1.08) with 4.73 moles of glycidol during 5 hours. The reaction product (3.43 eq.) was recovered by distillation under reduced pressure (yield: 98%) and characterized by $^1$H-NMR analysis following same procedure as detailed in Example 1, synthesis of mixture (M1).

The analysis yielded the following end-groups composition:
- 6% by moles of end-groups of formula —$CF_2CH_2OH$;
- 71% by moles of end-groups of formula —$CF_2CH_2OCH_2CH(OH)CH_2OH$;

23% by moles of end-groups of formula
—CF$_2$CH$_2$OCH$_2$CH(OH)CH$_2$OCH$_2$CH(OH)CH$_2$OH.

As determined by GPC analysis, the product had an average molecular weight of 3151 g/mol and a polydispersity index of 1.10.

Step 4.1: Protection of Vicinal Hydroxyl Groups

Same procedure as detailed in Example 1, step 1.1, was followed but charging the reactor with 5.55 Kg (3.43 eq.) of the product obtained as in Example 4, synthesis of mixture (M4), and refluxing under stirring the reaction mixture until water evolution stopped (about 25 hours).

A clear low-viscous product (5.53 Kg, 3.36 eq.) was isolated (yield: 98%) and characterized by $^1$H-NMR analysis.

Step 4.2: Molecular Distillation

The product (5.53 Kg; 3.36 eq.) obtained as in Example 4, step 4.1, was purified in a molecular distillator at 230° C. under 4.6×10$^{-3}$ mBar. The feed flow rate was set at 250 g/h.

Two low-viscous fractions were collected, a heavy residue (47.4% by weight) and a light fraction (52.6% by weight).

Step 4.3 and Step 4.4: Deprotection of the Heavy Residue and Distillation of Final Product Same procedure as detailed in Example 1, step 1.3, was followed but reacting 2.62 Kg of the heavy residue obtained as in Example 4, step 4.2, 370 g of methyl alcohol, 150 g of demineralised water and 30 g of a 30 wt. % aqueous solution of HCl during 6 hours.

A clear high-viscous product (2.55 Kg) was recovered by distillation under reduced pressure and characterized by $^1$H-NMR following same procedure as detailed in Example 1, synthesis of mixture (M1).

The analysis yielded the following end-groups composition:
- 4% by moles of end-groups of formula —CF$_2$CH$_2$OH;
- 57% by moles of end-groups of formula —CF$_2$CH$_2$O—CH$_2$CH(OH)—CH$_2$OH;
- 39% by moles of end-groups of formula —CF$_2$CH$_2$O—CH$_2$CH(OH)—CH$_2$—O—CH$_2$—CH(OH)—CH$_2$OH.

The composition of the mixture, as determined by $^1$H-NMR analysis, is the following:

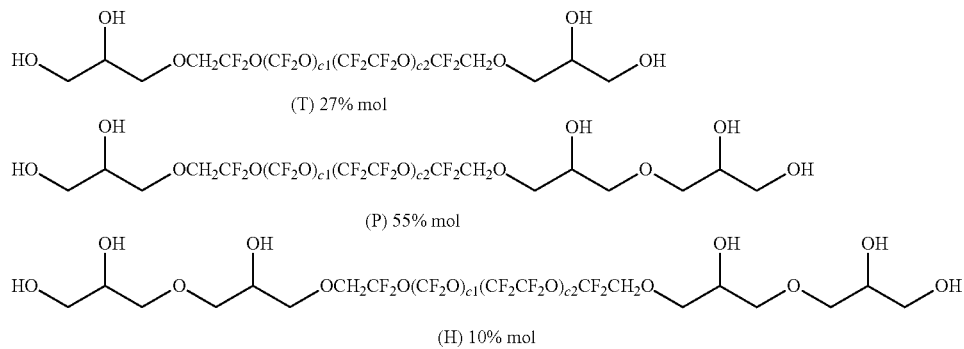

(T) 27% mol (P) 55% mol (H) 10% mol

Also, compounds having at least one end-group having formula —CF$_2$CH$_2$OH were detected (8% by moles).

As determined by GPC analysis, the product had an average molecular weight of 3196 g/mol and a polydispersity index of 1.09.

The invention claimed is:

1. A process for the purification of a polyol (per)fluoropolyether derivative [polyol (P)] from a mixture of hydroxyl (per)fluoropolyether derivatives [mixture (M)], said polyol (P) comprising one or more hydroxyl (per) fluoropolyether derivatives [PFPE(OH)] comprising at least one (per)fluoropolyoxyalkylene chain (chain R$_f$) and at least one end-group having formula (t$_3$);

—CF$_2$CH$_2$OCH$_2$CH(OH)CH$_2$OCH$_2$CH(OH)CH$_2$OH, said mixture (M) comprising said polyol (P) and at least one hydroxyl (per)fluoropolyether derivative [PFPE (OH)], said PFPE(OH) being different from said polyol (P) and comprising at least one (per)fluoropolyoxyalkylene chain (chain R$_f$) and at least one end-group selected from the group consisting of end-groups having formula (t$_1$): —CF$_2$CH$_2$OH and end-groups having formula (t$_2$):

—CF$_2$CH$_2$OCH$_2$CH(OH)CH$_2$OH, said process comprising the following steps:

step 1: reacting said mixture (M) with a ketone, an aldehyde, or a combination thereof so as to yield a corresponding mixture of cyclic ketal/acetal (per)fluoropolyether derivatives [PFPEs (OH)$_p$] [protected mixture (P)];

step 2: carrying out a molecular distillation of said protected mixture (P) so as to isolate a protected product heavy residue [product (P$_r$)];

step 3: hydrolyzing said product (P$_r$) so as to yield a deprotected product [product (P$_d$)]; and step 4: carrying out a distillation under reduced pressure of said product (P$_d$) so as to obtain said polyol (P).

2. The process according to claim 1, wherein the said hydroxyl (per)fluoropolyether derivative [PFPE (OH)] complies with formula (III-A):

$$T_1\text{-O}(CF_2O)_{c1}(CF_2CF_2O)_{c2}\text{-}T_2$$

wherein:
said T$_1$ and T$_2$, equal to or different from each other, are independently selected from the group consisting of said end-groups having said formula (t$_1$), said end-groups having said formula (t$_2$), and said end groups having said formula (t$_3$); and
said c1 and c2 are independently integers >0 such that the sum c1+c2 is in the range between 5 and 2000, the recurring units being statistically distributed along said (per)fluoropolyoxyalkylene chain.

3. The process according to claim 1,
wherein said polyol (P) comprises said hydroxyl (per)fluoropolyether derivative [PFPE (OH)] complying with a formula (III-A):

$$T_1\text{-O}(CF_2O)_{c1}(CF_2CF_2O)_{c2}\text{-}T_2 \text{ and}$$

wherein one of said T$_1$ and T$_2$ is an end-group having said formula (t$_3$) the remainder being an end-group having said formula (t$_2$).

4. The process according to claim 1, wherein said mixture (M) comprises said polyol (P) and at least one hydroxyl (per)fluoropolyether derivative [PFPE (OH)] which is different from said polyol (P) and which complies with a formula (III-A):

T1-O(CF$_2$O)$_{c1}$(CF$_2$CF$_2$O)$_{c2}$-T$_2$, wherein:
said T$_1$ and T$_2$, equal to or different from each other, are independently selected from the group consisting of said end-groups having said formula (t$_1$) and said end-groups having said formula (t$_2$);
said c1 and c2 are independently integers >0 such that the sum c1+c2 is in the range between 5 and 2000, the recurring units being statistically distributed along said (per)fluoropolyoxyalkylene chain.

5. The process according to claim 1, wherein said mixture (M) is manufactured by reacting at least one diol (per)fluoropolyether derivative [PFPE (OH)$_2$] comprising at least one said (per)fluoropolyoxyalkylene chain (chain R$_f$) and two diol end-groups with glycidol.

6. The process according to claim 5, wherein said diol (per)fluoropolyether derivative [PFPE (OH)$_2$] complies with formula (I-A):

T$_1$-O—R$_f$-T$_2$, wherein:
said R$_f$ is said (per)fluoropolyoxyalkylene chain (chain R$_f$); and
said T$_1$ and T$_2$ both comply with end-groups having said formula (t$_1$).

7. The process according to claim 5, wherein said diol (per)fluoropolyether derivative [PFPE (OH)$_2$] has a polydispersity index (PDI) ranging from 1 to 1.4.

8. The process according to claim 1, wherein said glycidol/PFPE (OH)$_2$ equivalent ratio is higher than 1.1 and lower than 1.4.

9. The process according to claim 1, wherein said cyclic ketal/acetal (per)fluoropolyether derivative [PFPE (OH)$_p$] complies with formula (I-B):

T'$_1$—O—R$_f$-T'$_2$, wherein:
said R$_f$ is said (per)fluoropolyoxyalkylene chain (chain R$_f$); and
said T'$_1$ and T'$_2$, equal to or different from each other, are independently selected from the group consisting of said end-groups having said formulae (t$_1$) end groups having a formula (t$_{2p}$), and end-groups having a formula (t$_{3p}$):

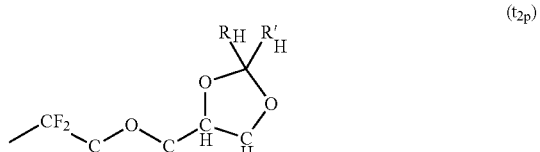

(t$_{2p}$)

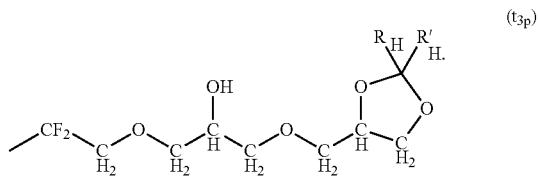

(t$_{3p}$)

10. The process according to claim 9, wherein said protected mixture (P) comprises a hemi-protected polyol (P) [polyol (P$_p$)], said polyol (P$_p$) comprising one or more said cyclic ketal/acetal (per)fluoropolyether derivatives [PFPEs (OH)$_p$] comprising at least one said (per)fluoropolyoxyalkylene chain (chain R$_f$) and at least one end-group having said formula (t$_{3p}$), and at least one said cyclic ketal/acetal (per)fluoropolyether derivative [PFPE (OH)$_p$] which is different from said polyol (P$_p$) and comprises at least one said (per)fluoropolyoxyalkylene chain (chain R$_f$) and at least one end-group selected from the group consisting of end-groups having said formulae (t$_1$) and end-groups having said formula (t$_2$p).

* * * * *